(12) United States Patent
Markevich et al.

(10) Patent No.: US 7,090,285 B2
(45) Date of Patent: Aug. 15, 2006

(54) AUTOMOTIVE DOOR ASSEMBLY

(75) Inventors: Andrei Markevich, Royal Oak, MI (US); Gary Morales, Northville, MI (US); James Kuo, Farmington Hills, MI (US); Patrick Schiavone, Birmingham, MI (US); Chelsia Lau, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 10/905,409

(22) Filed: Jan. 3, 2005

(65) Prior Publication Data

US 2006/0145513 A1    Jul. 6, 2006

(51) Int. Cl.
*B60J 9/00* (2006.01)

(52) U.S. Cl. ..................... 296/153; 292/216
(58) Field of Classification Search ............... 296/253, 296/152; 292/336.3, DIG. 31, DIG. 30
See application file for complete search history.

(56) References Cited

U.S. PATENT DOCUMENTS

| | | | | |
|---|---|---|---|---|
| 2,075,829 A | * | 4/1937 | Ottinger | 292/169.11 |
| 2,104,838 A | * | 1/1938 | Leonard | 292/1 |
| 2,141,225 A | * | 12/1938 | Rossmann | 70/264 |
| 2,243,282 A | * | 5/1941 | Marple | 292/214 |
| 2,276,325 A | * | 3/1942 | Marple | 70/485 |
| 2,301,221 A | * | 11/1942 | Marple | 292/216 |
| 2,301,557 A | * | 11/1942 | Marple | 292/138 |
| 2,327,441 A | * | 8/1943 | Marshall | 292/220 |
| 2,655,025 A | * | 10/1953 | Marple | 70/135 |
| 2,680,640 A | * | 6/1954 | Carry | 292/228 |
| 2,835,526 A | * | 5/1958 | Voorhees | 292/216 |
| 2,985,477 A | * | 5/1961 | Priestman | 292/336.3 |
| 3,039,290 A | * | 6/1962 | Johnstone | 70/264 |
| 3,209,563 A | * | 10/1965 | Pelcin | 70/489 |
| 3,305,258 A | * | 2/1967 | Peters | 292/198 |
| 3,408,100 A | * | 10/1968 | McKey | 296/106 |
| 4,135,759 A | * | 1/1979 | Bott et al. | 296/153 |
| 4,616,862 A | | 10/1986 | Ward | |
| 4,889,373 A | | 12/1989 | Ward et al. | |
| 5,733,046 A | | 3/1998 | Bellmore et al. | |
| 5,803,516 A | | 9/1998 | Hempel | |
| 6,000,257 A | | 12/1999 | Thomas | |
| 6,059,352 A | | 5/2000 | Heldt et al. | |

* cited by examiner

*Primary Examiner*—Kiran B. Patel
(74) *Attorney, Agent, or Firm*—Frank A. MacKenzie

(57) ABSTRACT

A door assembly is provided having an ergonomic egress handle. The egress handle includes a door release lever that is pivotally connected to an automotive vehicle door about an axis that is generally perpendicular to the door for unlatching the door so that the door may be opened relative to the vehicle. A method is also provided for operation of the door assembly.

17 Claims, 4 Drawing Sheets

AUTOMOTIVE DOOR ASSEMBLY

BACKGROUND OF THE INVENTION

1. Field of the Invention

The present invention relates generally to door assemblies, and more specifically, to door assemblies having an egress handle.

2. Background Art

Passenger vehicles often include vehicle doors for ingress and egress of passengers. The vehicle doors are often hinged to the vehicle so that each door may be pivoted open and pivoted closed. The doors often include latch mechanisms to secure the door in a closed position. The latching mechanisms are often temporarily released by manual actuation of a door release lever or button provided on the exterior or interior of the vehicle. For example, the prior art has provided automotive door assemblies having ingress handles provided on the exterior of the vehicle door, which may be utilized for unlatching the latching mechanism and may be utilized as a handle for pivoting the door to an open position.

Another offering of the prior art is to provide an egress handle within the vehicle. Often, the egress handle includes a door release lever that is mounted to an interior door panel and is pivoted about an axis generally parallel with an axis about which the door hinges. Conventionally, the passenger grasps the handle and pivots the handle by pulling the handle towards the passenger while concurrently pushing the door away from the passenger for opening the door. Due to this egress handle arrangement, the passenger is required to exert both a pulling force toward the passenger and a pushing force away from the passenger in order to open the vehicle door.

Door release levers of the prior art are commonly oriented in a central region of the door panel for passenger access. In order to permit the passenger to grasp the handle, the handle either extends from the door panel or is provided within a cavity in the door panel. Conventional door release levers may affect the overall size of the door panel and/or may limit the arrangement and location of other components provided on the door panel.

Another offering of the prior art is to provide an armrest on the door panel for facilitating passenger comfort within the vehicle. Since armrests are generally provided in a location that maximizes passenger comfort, ergonomics may be compromised in the placement of prior art door release levers.

Due to prior art arrangements of armrests and door release levers, door panel appearances may be compromised, by requiring distinct regions for an armrest and a door release lever.

In light of the foregoing, what is needed is a door assembly for a vehicle that satisfies ergonomics, compactness limitations and vehicle interior aesthetics. Further, a simplified method for opening an automotive vehicle door is needed.

SUMMARY OF THE INVENTION

An aspect of the present invention is to provide a door assembly for an automotive vehicle including a door operably connected to the vehicle. A latching mechanism is mounted to the door for latching the door to the vehicle in a closed orientation of the door. A door release lever is provided operably connected to the latching mechanism for releasing the latching mechanism upon actuation of the door release lever. The door release lever may be pivotally connected to the door for rotation about an axis that is generally perpendicular to the door.

A further aspect of the present invention is to provide a door release lever pivotally mounted to an armrest.

In one embodiment of the invention, a door release lever is mounted to a forward portion of an armrest.

Another aspect of the invention is to provide an arcuate door release lever pivotally mounted to a generally arcuate forward portion of an armrest assembly.

Yet another aspect of the invention is to provide an arcuate door release lever with a hollow underside for facilitating manually gripping, the lever being pivotally mounted to a door assembly.

A further aspect of the invention is to provide a door assembly having an armrest with a recess formed therein for receiving a manual door release lever therein.

In an embodiment of the invention, a door release lever is pivotally mounted to a door about an axis that is generally perpendicular to the door, and the door release lever is coupled to a cable for actuating a latching mechanism.

A further aspect of the invention is to provide a door release lever that is pivotally connected to an armrest, wherein the lever is actuated by extending a distal end of the lever away from the armrest.

A further aspect of the present invention is to provide a door panel mounted to an interior side of a motor vehicle door, an armrest mounted upon the door panel, and a door release lever pivotally mounted to the armrest for rotation about an axis generally perpendicular to the door.

A further aspect of the present invention is to provide an armrest having an armrest cushion and an armrest console, wherein the console extends at an incline in a forward direction of the associated vehicle.

In an embodiment of the invention, an armrest console includes a switch for operating an accessory of the vehicle.

In a further aspect of the present invention, a door assembly is provided with an armrest console, wherein a door release lever is pivotally mounted to the armrest console at a forward portion thereof.

In an embodiment of the invention, a forward region of the armrest console has a semi-cylindrical cross section.

A further aspect of the present invention is to provide a door release mechanism generally flush with an armrest for a facilitating compactness and streamlined aesthetic appearance.

Yet another aspect of the present invention is to provide a door release lever, which is actuated by application of a force that is applied generally parallel to the vehicle door.

A further aspect of the present invention is to provide a method for opening an automotive vehicle door by grasping a door release lever, pivoting the lever about an axis that is generally normal to the door, and pivoting the door open.

The above aspects, and other aspects, objects, features, advantages, and benefits of the present invention are readily apparent from a detailed description of embodiments of the present invention when taken in connection with the accompanying drawings.

DETAILED DESCRIPTION OF EMBODIMENTS OF THE INVENTION

Figure 1:
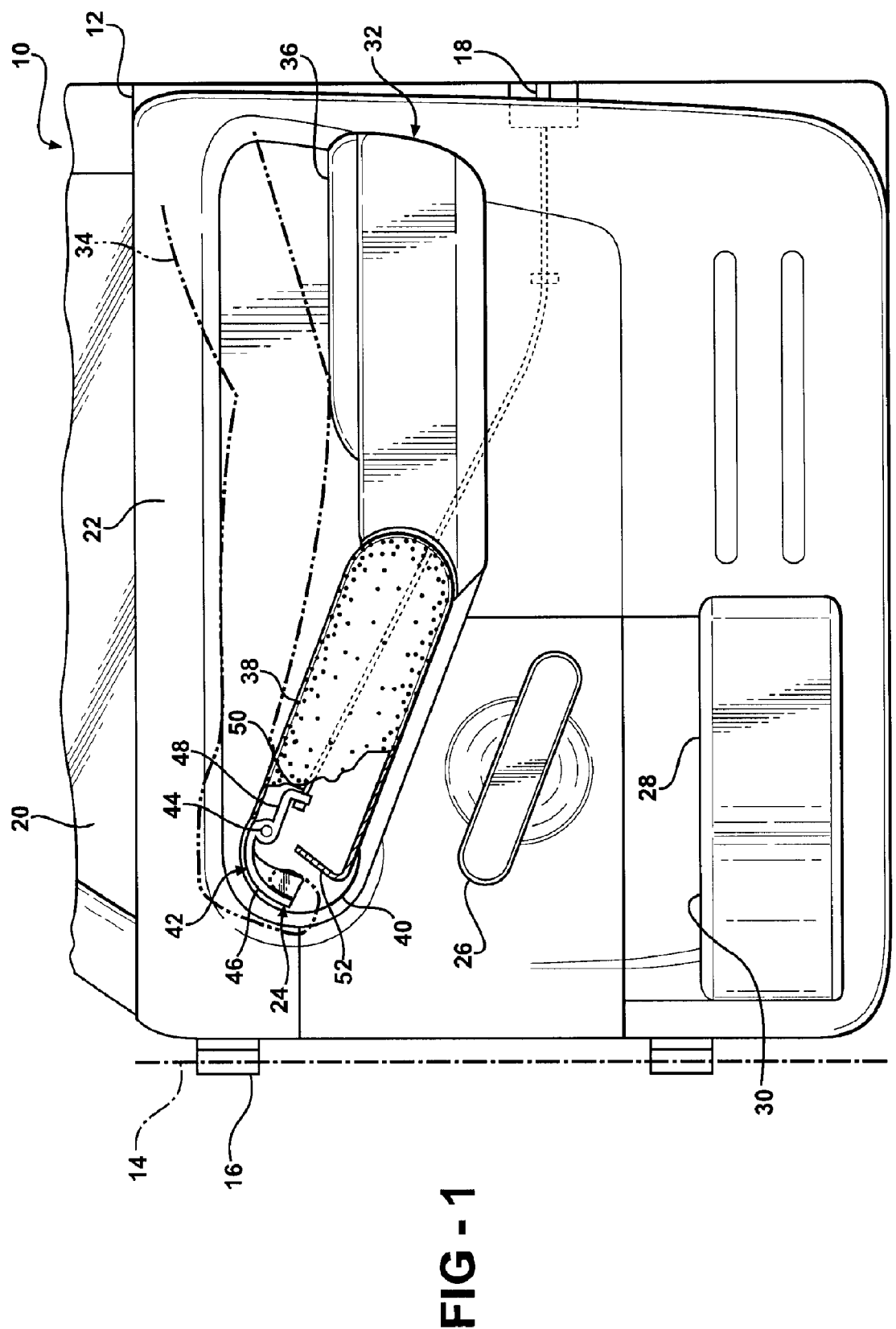
FIG. 1 is an interior side elevation view of an automotive vehicle door assembly in accordance with the teachings of the present invention, illustrated partially fragmented and in cooperation with an arm of a passenger.

Referring now to FIG. 1, a door assembly for an automotive vehicle is illustrated and referenced generally by numeral 10. The door assembly 10 is illustrated as a side door for a vehicle, specifically a front passenger-side door. However, any vehicle door is contemplated within the spirit and scope of the present invention, including sliding side doors, rear doors, liftgates, tailgates or the like.

The door assembly 10 includes a structural door 12, which, for example, is pivotally connected to the associated vehicle about a pivot axis 14 via door hinges 16. The door assembly 10 also includes a latching mechanism 18, which may engage a striker within the vehicle door jam for latching the door 12 in a closed orientation. Further, the door assembly 10 may be provided with a window 20 extending above a ridge line of the vehicle.

The door assembly 10 as illustrated, includes an interior door panel 22 mounted to the door 12, generally facing the interior of the motor vehicle. The door panel 22 encloses the components of the door assembly 10 and may be formed from a rigid polymer such as ABS plastic and may include foam, cushioning, vinyl, fabric, wood or metal cladding or the like, or ornamental indicia where desired to provide comfort and an aesthetic styling and design appeal to the passenger housed within the vehicle.

The door assembly 10 may include an ingress handle (not shown) mounted on an exterior side of the door 12. The ingress handle may be utilized by a passenger outside the vehicle for unlatching the latch mechanism 18 and pivoting the door assembly 10 about the pivot axis 14. Additionally, the door assembly 10 may include an egress handle 24 mounted to the door panel 22 for temporarily unlatching the latching mechanism 18 from within the vehicle.

The door panel 22 may include other functional features. For example, the door panel 22 may include a structural handle 26, which may be grasped by the passenger for pulling the door assembly 10 to a closed orientation. Additionally, the door panel 22 may include a side pocket 28 for receiving and transporting articles therein, such as maps, periodicals and other publications or media. The side pocket 28 may be provided with a beverage holder 30 for receiving and transporting beverages.

The door panel 22 may also include an armrest assembly 32 extending laterally inward therefrom for supporting a passenger's arm 34. The armrest assembly 32 may include an armrest cushion 36 for providing padded comfort to the passenger's arm 34. The armrest cushion 36 illustrated extends generally horizontally from the door panel 22 for providing underlying support and comfort to the arm 34 of the passenger.

The armrest assembly 32 also includes an armrest console 38 for controlling various features of the door assembly 10. The armrest console 38 extends away from the armrest cushion 36 and is inclined in a forward direction of the vehicle, terminating at a forward portion 40.

The egress handle 24 includes a door release lever 42 pivotally mounted to the armrest console forward portion 40 at a pivotal connection 44.

The door release lever 42 illustrated includes a forward distal grip portion 46, which may be gripped by the passenger as illustrated in FIG. 1 for actuation of the lever 42. The door release lever 42 may also include a second distal end 48 that is disposed within the armrest console 38. The second distal end 48 of the lever 42 is connected to the latching mechanism 18 through a sheathed cable 50.

Figure 2:
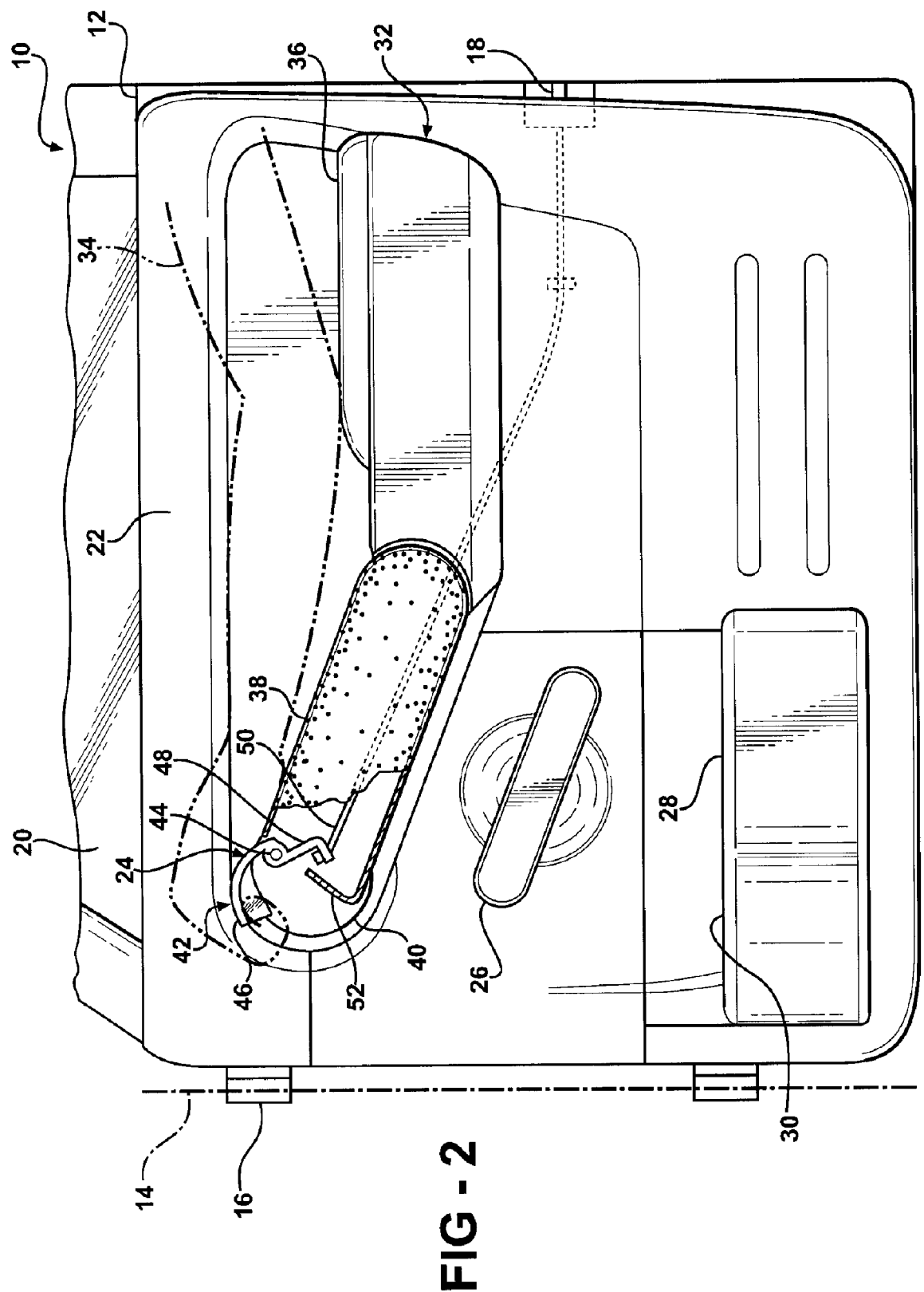
FIG. 2 is an interior side elevation view of the door assembly of FIG. 1, illustrated with the passenger arm actuating a door release lever.

With reference now to FIG. 2, the passenger may temporarily unlatch the latching mechanism 18 by pivoting the door release lever 42 about the pivotal connection 44 by extending the grip portion 46 away from the armrest console forward portion 40. By manually actuating the door release lever 42 in this manner, the second distal end 48 is rotationally translated forward thereby extending the cable 50, which consequently unlatches the latching mechanism 18.

The latching mechanism 18 and/or the egress handle 24 may include a return spring for returning the latch mechanism 18 to a latched orientation upon release of manual force applied to the door release lever 42. The spring return may also return the door release lever 42 to the retracted position as illustrated in FIG. 1.

Since the door release lever 42 pivots about the pivotal connection 44, which is generally perpendicular to the door 12, the passenger is required to apply a force, which is generally parallel to the door. Thus, the passenger grasps the grip portion 46, urges it rearward and presses the door assembly 10 outward to open the door. This operation is ergonomic in comparison to prior art door assemblies, which require the passenger to pull a door release lever in a direction that is generally perpendicular and away from the door, while also pushing the door outwards. As illustrated in FIG. 2, the passenger's arm 34 maintains an orientation that is adjacent to the door panel 22 when the grip portion 46 has been fully actuated. Thus, one handed opening of the door assembly 10 may be performed with ease, while still adequately supported by the armrest assembly 32.

Due to the incline of the armrest console 38, the door release lever 42 is readily viewable and reachable to the passenger. Thus, the passenger is not required to look beneath the armrest assembly 32 to locate the egress handle 24. Additionally, the passenger is not required to reach within a cavity recessed within the door panel to grasp the egress handle.

Figure 3:
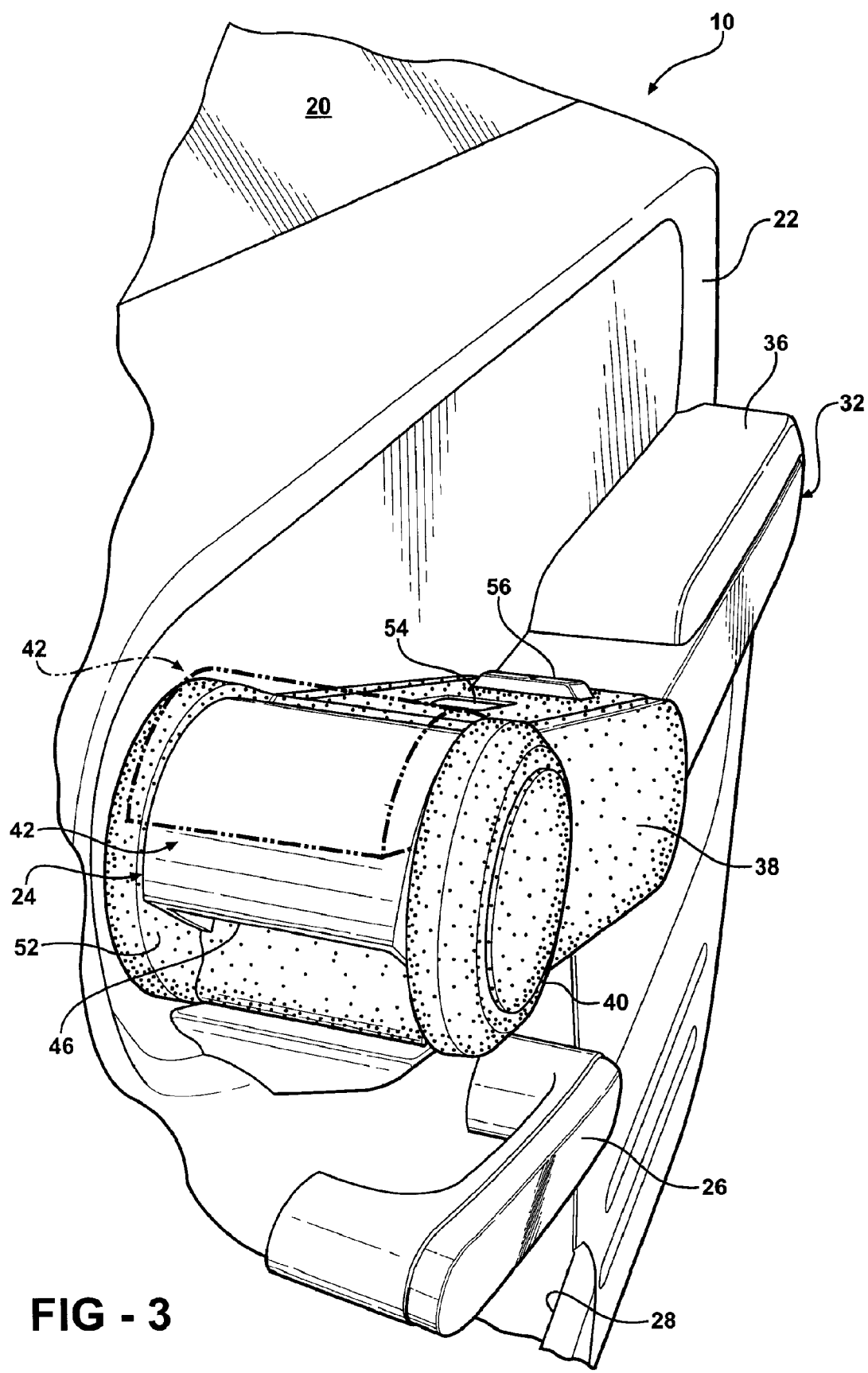
FIG. 3 is a front perspective view of the door assembly of FIG. 1.

Referring now to FIGS. 1 to 3, the door release lever 42 has a generally arcuate cross section with a hollow underside provided between lateral sidewalls thereby providing the grip portion 46. The armrest console forward portion 40 is generally semi-cylindrical with a forward recess 52 formed therein for receiving the grip portion 46 in the latched orientation of the door release ever 42, as illustrated in FIGS. 1 and 3.

As the passenger actuates the grip portion 46, the grip portion 46 is extended partially away from and out of the recess 52 as illustrated in FIG. 2, and in phantom in FIG. 3. Thus, in a latched orientation of the door release lever 42, the lever 42 is oriented generally flush with the armrest console forward portion 40 for providing a streamlined aesthetic appearance within the vehicle interior that is not obfuscated by an outwardly projecting egress handle. Additionally, the compactness of the door panel 22 is optimized by combining the egress handle 24 with the armrest assembly 32. Further, ergonomics are optimized for the egress handle 24 and comfort is maximized for the armrest assembly 32 so that neither features are compromised in their available locations provided upon the door panel 22.

Figure 4:
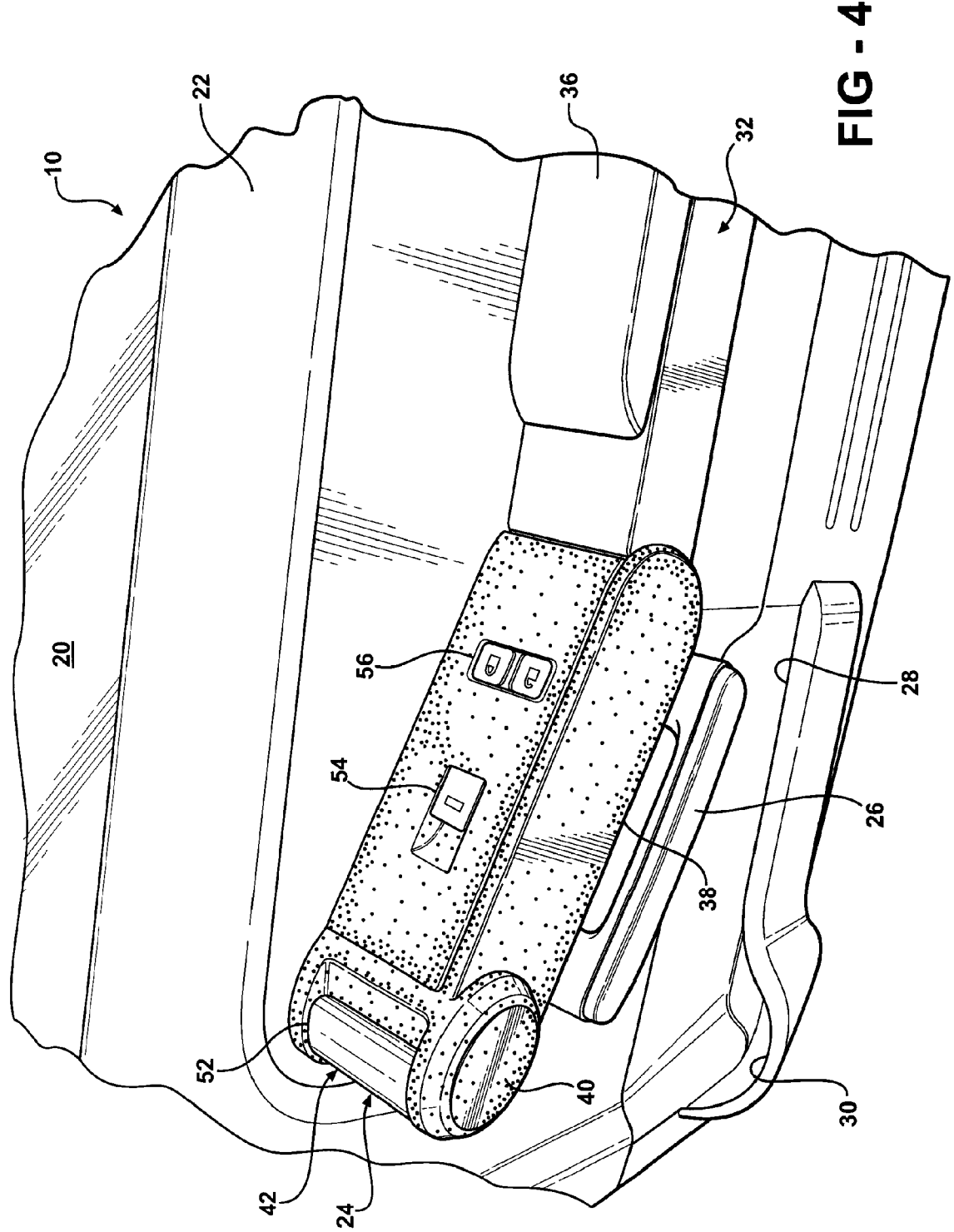
FIG. 4 is an interior side and top perspective view of the door assembly of FIG. 1.

With reference now to FIG. 4, the forward incline of the armrest console 38 facilitates further functionality of the door assembly 10. For example, switches are provided on the console such as a window up/down switch 54 and an unlock/lock switch 56. The inclined armrest console 38 presents these switches 54, 56 in orientations that are both readily viewable and accessible to the passenger.

The window switch 54 controls the operation of the window by permitting the passenger to open and close the window, as is commonly known in the art. The unlock/lock switch 56 permits the passenger to unlock and lock the doors. Electronically controlled unlock and lock mechanisms are also well known in the art. The invention contemplates that other switches, electrical controls or mechanical controls may be provided upon the armrest console 38, such as side view mirror adjustments, seat adjustments or the like.

In summary, the passenger may open the door by grasping the door release lever 42 by its grip portion 46 and pivoting the lever 42 about its pivotal connection 44. Subsequently, the passenger applies a force against the door panel 22 for opening the door assembly 10. The door assembly 10 of the present invention maximizes convenience, aesthetics, packaging, ergonomics and features for the passenger in the vehicle.

While an exemplary embodiment for carrying out the invention has been described in detail, those familiar with the art to which this invention relates will recognize various alternative designs and embodiments for practicing the invention as defined by the following claims.

What is claimed is:

1. A door assembly for an automotive vehicle comprising:
    a door operably connected to an automotive vehicle for permitting access into the vehicle in an open orientation of the door, and for limiting access into the vehicle in a closed orientation of the door;
    a latching mechanism mounted to the door for latching the door to the vehicle in the closed orientation;
    a door release lever operatively connected to the latching mechanism so that actuation of the door release lever unlatches the latching mechanism for opening the door, the door release lever being pivotally connected to the door for rotation about an axis that is generally perpendicular to the door; and
    an armrest mounted to an interior side of the door, the armrest having a forward portion facing a forward direction of the vehicle, wherein the door release lever is mounted to the armrest forward portion.

2. A door assembly for an automotive vehicle comprising:
    a door operably connected to an automotive vehicle for permitting access into the vehicle in an open orientation of the door, and for limiting access into the vehicle in a closed orientation of the door;
    a latching mechanism mounted to the door for latching the door to the vehicle in the closed orientation;
    a door release lever operatively connected to the latching mechanism so that actuation of the door release lever unlatches the latching mechanism for opening the door, the door release lever being pivotally connected to the door for rotation about an axis that is generally perpendicular to the door; and
    an armrest mounted to an interior side of the door, the armrest having a generally arcuate forward portion facing a forward direction of the vehicle, wherein the door release lever is generally arcuate and is mounted to the armrest forward portion.

3. A door assembly for an automotive vehicle comprising:
    a door operably connected to an automotive vehicle for permitting access into the vehicle in an open orientation of the door, and for limiting access into the vehicle in a closed orientation of the door;
    a latching mechanism mounted to the door for latching the door to the vehicle in the closed orientation; and
    a door release lever operatively connected to the latching mechanism so that actuation of the door release lever unlatches the latching mechanism for opening the door, the door release lever being pivotally connected to the door for rotation about an axis that is generally perpendicular to the door;
    wherein the door is pivotally connected to the vehicle, and a passenger opens the door assembly from inside the vehicle by applying a force to the door release lever in a direction that is generally parallel to the door, and by subsequently applying a force to the door that is not parallel to the pivotal connection of the door.

4. The door assembly of claim 1 wherein the door release lever has a generally arcuate cross section with a hollow underside to be gripped manually.

5. The door assembly of claim 1 wherein the armrest has a recess formed therein and the door release lever is mounted within the armrest recess.

6. The door assembly of claim 5 further comprising a cable disposed within the door assembly, the cable being coupled to the door release lever second end and the latching mechanism so that manual actuation of the door release lever translates the cable and consequently unlatches the latching mechanism.

7. The door assembly of claim 1 wherein the door release lever is mounted upon the armrest.

8. The door assembly of claim 7 wherein the door release lever is oriented flush with the armrest in a retracted orientation thereof for providing a streamlined automotive interior.

9. The door assembly of claim 7 wherein the door release lever is manually actuated by extending a distal end of the door release lever away from the armrest.

10. The door assembly of claim 7 wherein the door release lever includes a first distal end displaced external from the armrest to be gripped and actuated manually, and a second end disposed within the armrest and operably connected to the latching mechanism for unlatching the door.

11. The door assembly of claim 1 further comprising:
    a door panel mounted to an interior side of the door, wherein the door release lever is mounted upon the armrest.

12. The door assembly of claim 11 wherein the armrest further comprises:
    an armrest cushion having an arm receiving surface that is displaced generally horizontal and adjacent to the door panel; and
    an armrest console extending from the armrest cushion at an incline in a forward direction.

13. The door assembly of claim 12 wherein the armrest console further comprises at least one switch for operating at least one accessory associated with the door assembly.

14. The door assembly of claim 12 wherein the door release lever is mounted to a forward distal end of the armrest console.

15. The door assembly of claim 14 wherein the forward distal end of the armrest console has a semi-cylindrical cross-section.

16. The door assembly of claim 15 wherein the door release lever has a semi-cylindrical cross-section, and the armrest console forward portion includes a recess formed therein to receive the door release lever generally flush with the armrest console forward portion in a latched position of the door release lever.

17. The door assembly of claim 16 wherein the door release lever is pivotally connected to the armrest console forward portion and the door release lever includes a distal end whereby the door release lever is actuated by extending the distal end away from the armrest console forward portion, thereby rotating the door release lever and consequently unlatching the latching mechanism.

* * * * *